United States Patent
Robertson, II

(10) Patent No.: US 8,234,196 B2
(45) Date of Patent: Jul. 31, 2012

(54) SYSTEMS AND ASSOCIATED METHODS FOR IMPLEMENTING ELECTRONIC PROPERTY BOND PAYMENTS

(76) Inventor: Charles T. Robertson, II, Woodstock, GA (US)

( * ) Notice: Subject to any disclaimer, the term of this patent is extended or adjusted under 35 U.S.C. 154(b) by 82 days.

(21) Appl. No.: 12/981,447

(22) Filed: Dec. 29, 2010

(65) Prior Publication Data

US 2011/0161219 A1 Jun. 30, 2011

Related U.S. Application Data

(60) Provisional application No. 61/291,730, filed on Dec. 31, 2009.

(51) Int. Cl.
*G06Q 40/00* (2012.01)
(52) U.S. Cl. .......................... 705/35; 705/37
(58) Field of Classification Search .............. 705/35, 705/37
See application file for complete search history.

(56) References Cited

U.S. PATENT DOCUMENTS

| | | | |
|---|---|---|---|
| 7,158,621 B2 * | 1/2007 | Bayne | 379/114.13 |
| 7,194,435 B1 * | 3/2007 | Sforzo | 705/37 |
| 7,519,375 B2 * | 4/2009 | Polozola et al. | 455/456.1 |
| 2007/0156462 A1 * | 7/2007 | Kazanchian et al. | 705/4 |

OTHER PUBLICATIONS

Max B. Baker. (May 8, 1997). County pledges stiffer reviews of bail bondsmen Beginning Jul. 1, the industry can expect more frequent checks on criminal records and assets :[Final AM Edition]. Fort Worth Star—Telegram,p. 1. Retrieved May 18, 2012.*

* cited by examiner

*Primary Examiner* — Kito R Robinson
(74) *Attorney, Agent, or Firm* — Bradley D. Crose; Crose Law LLC

(57) ABSTRACT

A system, associated methods, computer readable storage medium encoded with programming, and computer program product are disclosed for simultaneously collating information from available public, private, and government databases for provision to corrections facilities, authorized bond administrators, stakeholders, or the like for electronic transmission of secured and confirmed data to effectuate implementation of obligation on a property bond as security for court appearances for an accused.

20 Claims, 4 Drawing Sheets

SYSTEMS AND ASSOCIATED METHODS FOR IMPLEMENTING ELECTRONIC PROPERTY BOND PAYMENTS

CROSS-REFERENCE TO RELATED APPLICATION(S)

The present non-provisional patent application claims the benefit of priority of U.S. Provisional Patent Application No. 61/291,730, which is entitled "ELECTRONIC PROPERTY BOND PROCESS", which was filed on Dec. 31, 2009, and which is incorporated in full by reference herein.

FIELD OF THE INVENTION

The technology described herein relates generally to the fields of data processing, legal courts having associated bail and bond processing, and pledged security processes. More specifically, this technology relates to a system and associated methods for implementing electronic property bond payments. Furthermore, this technology relates to a unique application of available databases which provide the ability to implement the secure and confirmed alienation of real property as collateral to secure the appearance of persons charged with a violation of federal, state or local laws, rules, ordinances, or violations.

BACKGROUND OF THE INVENTION

State and Federal laws provide that persons charged with a crime may be released from incarceration upon the posting of an appropriate security for their appearance. This security is called a "bail" or "bond" in many jurisdictions, but, for purposes of this section, the term "bail" shall refer to all pledged security processes. Historically, bail was provided in one of three ways: 1) a cash amount provided to the court or incarcerator; 2) a surety posted by a third party (traditionally called a "bail bondsman"); or 3) a "property bond" could be placed.

A "property bond" is a term of art in the legal field referring to the voluntary accretion of a lien upon real estate to secure the appearance of someone charged with a crime. The process of presenting an acceptable "property bond" to the corrections authority has not changed since the concept was instituted, over one hundred years ago. However, known property bond processes suffer from several inherent complications and deficiencies, including, but not limited to, the following: 1) establishing ownership of the property in question; 2) establishing appropriate equity in the property equivalent to the amount of bail requested; 3) formally establishing the lien and attaching the lien to the property, 4) releasing the lien upon appearance; and 5) insuring that the individual presenting the lien is authorized to alien the subject property.

Therefore, a need exists for a system and associated methods for implementing electronic property bond payments as is disclosed herein. The within and foregoing systems and associated methods circumvent these known complications, and provides a process for the electronic implementation, confirmation, and release of such security.

BRIEF SUMMARY OF THE INVENTION

In various exemplary embodiments, the technology described herein provides systems and associated methods for simultaneously collating information from available public, private, and government databases for provision to corrections facilities, authorized bond administrators, stakeholders, and the like for electronic transmission of secured and confirmed data to effectuate implementation of obligation on a property bond as security for court appearances for an accused.

In one exemplary embodiment, the technology described herein provides a computer readable storage medium encoded with programming for simultaneously collating information from available public, private, and government databases for provision to corrections facilities, authorized bond administrators, and stakeholders for electronic transmission of secured and confirmed data to effectuate implementation of obligation on a property bond as security for court appearances for an accused.

The computer readable medium is encoded with programming configured to: receive from an applicant an application identifying a property upon which a lien is to be placed to serve as collateral for an issuance of a property bond for release of an incarcerated person, the application having a plurality of identification data on the property and having a plurality of identification data on the applicant; access at least one data store to obtain at least one data point upon which to evaluate the one or more of the identification data on the property and the identification data on the applicant; evaluate the application based upon one or more decision factors; rank the one or more decision factors on a predetermined scale to quantify an impact to the corrections facility, or the like, of acceptance of the property bond from the applicant based on the property identification data and the applicant identification data; calculate a single numerical value representative of the rank of each of the one or more decision factors; compare the calculated value with a predetermined benchmark to determine whether issuance of the property bond is a suitable option for the correction facility, or the like, to accept; and issue the property bond if determined to be a suitable option.

The computer readable medium also can be encoded with programming configured to: confirm the identification data on the applicant and the identification data on the property with at least one first real estate digest, wherein the at least one data store comprises the at least one first real estate digest selected from the group consisting of: federal, state, and local real estate property registries, each of which shows the legal owner and address of real property.

The computer readable medium further can be encoded with programming configured to: confirm the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property.

The computer readable medium also can be encoded with programming configured to: test the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation; and extrapolate an estimated real estate value of the property.

The computer readable medium also can be encoded with programming configured to test an estimated value of the property against confirmed obligations to check whether a required security for the appearance of a person charged is adequate; and evaluate the adequacy of the security.

The computer readable medium further can be encoded with programming configured to test an estimated value of the property, the identification data on the applicant, and the identification data on the property against a required security to issue the property bond.

The computer readable medium also can be encoded with programming configured to test the amounts of the recorded liens and encumbrances against individuals and specific property against credit bureau balances.

The computer readable medium further can be encoded with programming configured to utilize an interactive, on-screen interview questionnaire. Additionally, the programming can be configured to coach an applicant as the applicant responds to the interactive, on-screen interview questionnaire.

The computer readable medium also can be encoded with programming configured to allow the addition of one or more decision factors interactively by an operator based on a particular functional or operational driver currently unaddressed.

The computer readable medium further can be encoded with programming configured to allow the rescaling, by an operator, of the predetermined scale used to quantify each decision factor's impact to the corrections facility, or the like, in response to business drivers.

The computer readable medium also can be encoded with programming configured to allow the reconfiguration, by an operator, of the predetermined benchmark used determine whether issuance of the property bond is a suitable option.

In another exemplary embodiment, the technology described herein provides a method for simultaneously collating information from available public, private, and government databases for provision to corrections facilities, authorized bond administrators, and stakeholders for electronic transmission of secured and confirmed data to effectuate implementation of obligation on a property bond as security for court appearances for an accused.

The method includes: receiving from an applicant an application identifying a property upon which a lien is to be placed to serve as collateral for an issuance of a property bond for release of an incarcerated person, the application having a plurality of identification data on the property and having a plurality of identification data on the applicant; accessing at least one data store to obtain at least one data point upon which to evaluate the one or more of the identification data on the property and the identification data on the applicant; evaluating the application based upon one or more decision factors; ranking the one or more decision factors on a predetermined scale to quantify an impact to the corrections facility, or the like, of acceptance of the property bond from the applicant based on the property identification data and the applicant identification data; calculating a single numerical value representative of the rank of each of the one or more decision factors; comparing the calculated value with a predetermined benchmark to determine whether issuance of the property bond is a suitable option for the correction facility, or the like, to accept; and issuing the property bond if determined to be a suitable option.

The method also can include confirming the identification data on the applicant and the identification data on the property with at least one first real estate digest, wherein the at least one data store comprises the at least one first real estate digest selected from the group consisting of: federal, state, and local real estate property registries, each of which shows the legal owner and address of real property.

The method further can include confirming the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property.

The method also can include: testing the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation; and extrapolating an estimated real estate value of the property.

The method further can include testing an estimated value of the property against confirmed obligations to check whether a required security for the appearance of a person charged is adequate; and evaluating the adequacy of the security.

The method also can include testing an estimated value of the property, the identification data on the applicant, and the identification data on the property against a required security to issue the property bond.

In yet another exemplary embodiment, the technology described herein provides a computer program product for simultaneously collating information from available public, private, and government databases for provision to corrections facilities, authorized bond administrators, and stakeholders for electronic transmission of secured and confirmed data to effectuate implementation of obligation on a property bond as security for court appearances for an accused.

The computer program product includes: a computer readable storage medium readable by a processor of a computer and configured to store instructions for execution by the processor for performing a method comprising: receiving from an applicant an application identifying a property upon which a lien is to be placed to serve as collateral for an issuance of a property bond for release of an incarcerated person, the application having a plurality of identification data on the property and having a plurality of identification data on the applicant; accessing at least one data store to obtain at least one data point upon which to evaluate the one or more of the identification data on the property and the identification data on the applicant; evaluating the application based upon one or more decision factors; ranking the one or more decision factors on a predetermined scale to quantify an impact to the corrections facility, or the like, of acceptance of the property bond from the applicant based on the property identification data and the applicant identification data; calculating a single numerical value representative of the rank of each of the one or more decision factors; comparing the calculated value with a predetermined benchmark to determine whether issuance of the property bond is a suitable option for the correction facility, or the like, to accept; and issuing the property bond if determined to be a suitable option.

The computer readable storage medium readable by the processor of the computer and configured to store instructions for execution by the processor can be further configured for performing methods steps including: confirming the identification data on the applicant and the identification data on the property with at least one first real estate digest, wherein the at least one data store comprises the at least one first real estate digest selected from the group consisting of: federal, state, and local real estate property registries, each of which shows the legal owner and address of real property; confirming the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property; testing the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation; extrapolating an estimated real estate value of the property; testing an estimated value of the property against confirmed obligations to check whether a required security for the appearance of a person charged is adequate; evaluating the adequacy of the security; and testing an estimated value of the property, the identification data on the applicant, and the identification data on the property against a required security to issue the property bond.

Advantageously, the systems and associated methods described herein overcome many shortcomings and deficiencies with known processes. By way of example, under the current processes in place for over 100 years, the individual proposing to alien his property was burdened by the obligation of procuring deeds reflecting his ownership. Advantageously, the technology described herein removes the obligation of the alienor to provide deeds.

Additionally, under the current processes in place for over 100 years, the individual proposing to alien his property was burdened by the obligation of procuring tax records reflecting the valuation of the property. Also advantageously, the systems and methods described herein remove the obligation of the alienor to provide tax records.

Furthermore, under the current processes in place for over 100 years, the individual proposing to alien his property was burdened by the obligation of procuring lien and security obligations reflecting the extent of the prior alienation of the value of the property. However, the technology described herein advantageously removes the obligation of the alienor to provide cumulative obligation valuations.

Still furthermore, under the current processes in place for over 100 years, the court or corrections facility uses a subjective and incomplete evaluation criterion for the evaluation and acceptance of property alienation. Further advantageously, the systems and methods described herein remove the inconsistency and inaccuracy of the evaluating official having incomplete information regarding the transaction.

Thus, most advantageously, the systems and methods described herein provide a replacement of traditional bond requirements currently in places. In many cases the technology described herein will preclude the need for traditional bail bonds.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides systems and associated methods for simultaneously collating information from available public, private, and government databases for provision to corrections facilities, authorized bond administrators, stakeholders, or the like for electronic transmission of secured and confirmed data to effectuate implementation of obligation on a property bond as security for court appearances for an accused.

Figure 1:
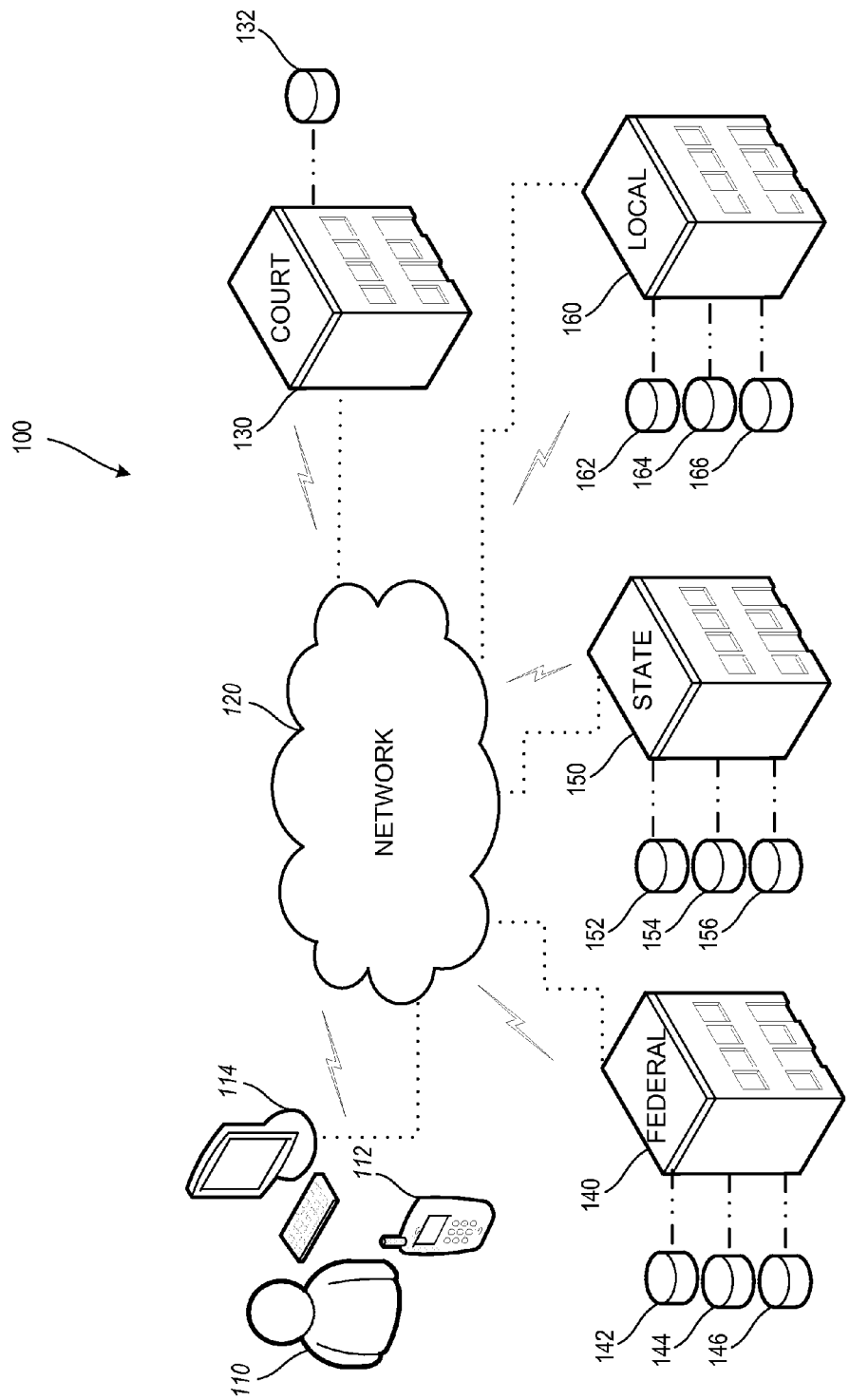
FIG. 1 is a schematic diagram illustrating a system architecture for implementing electronic property bond payments, according to an embodiment of the technology described herein.

Referring now to FIG. 1, a system architecture 100 for simultaneously collating information from available public, private, and government databases for provision to corrections facilities, authorized bond administrators, stakeholders, or the like for electronic transmission of secured and confirmed data to effectuate implementation of obligation on a property bond as security for court appearances for an accused is shown.

As shown in FIG. 1, a prospective applicant 110 may apply for a property bond by submitting an application identifying a property upon which a lien is to be placed and thereby operate to serve as collateral for an issuance of a property bond for release of an incarcerated person. By way of example, and not of limitation, the applicant 110 may apply in person, online through a terminal 114 or wireless device, phone 112, or the like. Additionally, the applicant 110 may apply in person through an operator having access to the system 100, such as, for example, a clerk at court 130 having at least system database 132. Applicant's application will include, for example, identification data on the property and identification data on the applicant 110. Electronic connectivity is provided over network 120. By way of example, the network 120 can include a public network such as the Internet, a private network, a virtual private network, and so forth.

The application process includes programmatically accessing databases and systems at one or more of federal 140, state 150, and local 160 entities. The federal 140, state 150, and local 160 entities may include those having property records, tax records, recordation records for mortgages, liens, and the like.

The application process includes access to a first set of real estate digests such as federal 142, state 152, and local 162 real estate property registries or databases. Each real estate property registry or database 142, 152, 162 shows the legal owner and address of real property. By way of example, with access to these real estate property registries or databases 142, 152, 162, one can confirm the identification data on the applicant 110 and the identification data on the property with at least one first real estate digest.

The application process includes access to a second set of real estate digests such as federal 144, state 154, and local 164 real estate property registries or databases, each of which shows the recorded liens and encumbrances against individuals and specific property. By way of example, with access to these real estate property registries or databases 144, 154, 164, one can confirm the identification data on the applicant and the identification data on the property for the existence of any mortgages and liens. The information obtained from access to the federal 144, state 154, and local 164 real estate property registries or databases can be paired with data reviewed and obtained from the first set of real estate digests such as federal 142, state 152, and local 162 real estate property registries or databases.

The application process includes access to a set of real estate tax records databases such as federal 146, state 156, and local 166, each of which shows the amount and existences of current legal valuation. By way of example, with access to the real estate tax records databases 146, 156, 166, one can test the identification data on the applicant 110 and the identification data on the property against a tax database 146, 156, 166 to obtain an estimated value for an amount and existence of current legal valuation. Additionally, once one has accesses to the real estate tax records databases 146, 156, 166, one can extrapolate an estimated real estate value of the property upon which applicant 110 seeks a property bond to be secured. The information obtained from access to the real estate tax records databases 146, 156, 166 can be coupled to the date from one or more of the first set of real estate digests such as federal 142, state 152, and local 162 real estate property registries or databases and the federal 144, state 154, and local 164 real estate property registries or databases.

Figure 2:
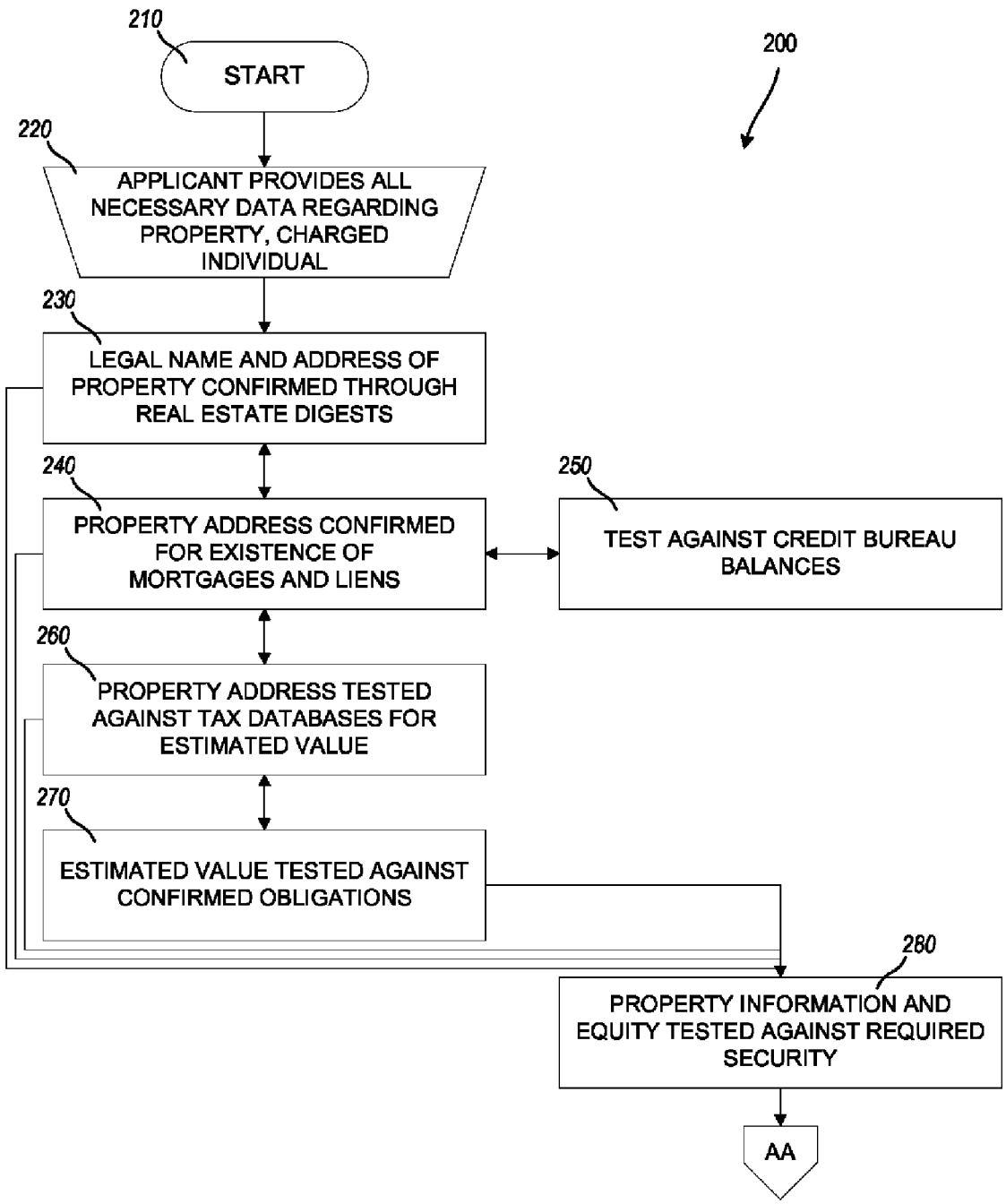
FIGS. 2 and 3 are flowchart diagrams illustrating method steps for implementing electronic property bond payments, according to an embodiment of the technology described herein.
Figure 3:
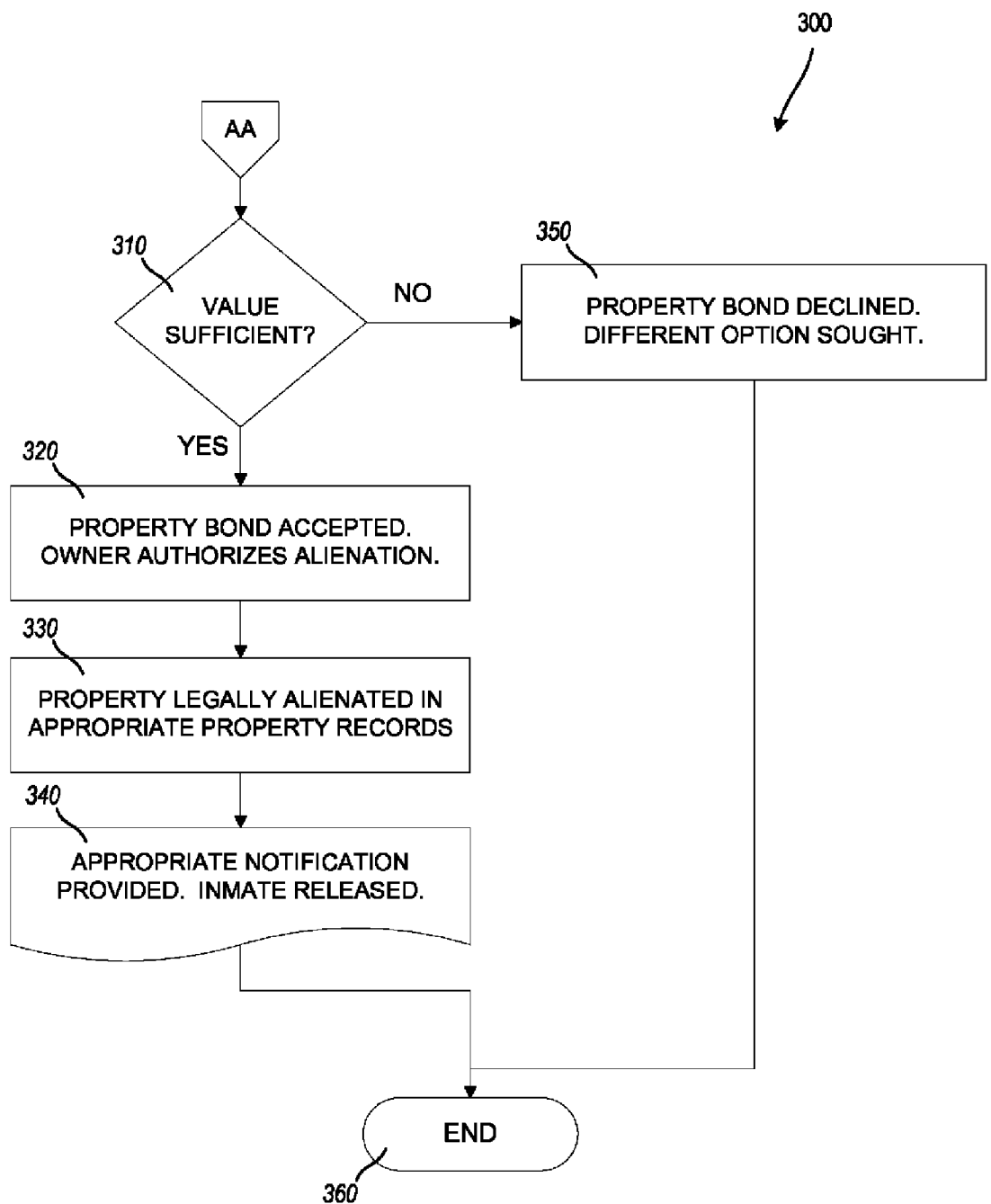

Referring now to FIGS. 2 and 3, flowchart diagrams 200 and 300 are provided illustrating method steps for simultaneously collating information from available public, private, and government databases for provision to corrections facilities, authorized bond administrators, and stakeholders for electronic transmission of secured and confirmed data to effectuate implementation of obligation on a property bond as security for court appearances for an accused, for example, in the system depicted in FIG. 1.

At step 210 the method commences and the process for applying for and optimally obtaining a property bond begins. At step 220 an applicant provides all necessary data regarding the specific property and the charged individual. Applicant enters a multiplicity of data fields pertaining to the applicant seeking the property bond. Applicant also enters a multiplicity of data fields pertaining to the property upon which a lien will be placed if the applicant successfully obtains the desired property bond with which to secure the release of the incarcerated.

At step 230 the legal name and address of property is confirmed through real estate digests. As depicted in FIG. 1, confirmation can be provided through access to a first set of real estate digests such as federal 142, state 152, and local 162 real estate property registries or databases. Each real estate property registry or database 142, 152, 162 shows the legal owner and address of real property. As such the system overseer confirms the address and property in the application.

At step 240 the property address is confirmed and checked for the existence of mortgages and liens against the property. As depicted in FIG. 1, confirmation can be provided through access to a second set of real estate digests such as federal 144, state 154, and local 164 real estate property registries or databases, each of which shows the recorded liens and encumbrances against individuals and specific property. As such the system overseer confirms the property address from the application.

At step 250 the applicant and the existence of mortgages and liens against the property, if any, are checked against credit bureau balances. Credit bureaus such as TransUnion, EquiFax, and the like can be used.

At step 260 the property address is tested against tax databases for an estimated value. As depicted in FIG. 1, the property address supplied in the application can be tested against the tax databases by access to a set of real estate tax records databases such as federal 146, state 156, and local 166, each of which shows the amount and existences of current legal valuation. By way of example, the real estate registries which now show ownership and addresses, and which are tested against liens and encumbrances, can now be tested against federal, state or local real estate tax records for the amount and existences of current legal valuation, and extrapolation of estimated real estate value. As such, a system overseer can obtain an estimated, extrapolated property value of the property identified in the application.

At step 270 the estimated value is tested against confirmed obligations. By way of example, the estimate real estate value can be tested against the required security for the appearance of the person charged, for adequacy of security.

At step 280 the property information and equity is tested against the required security. By way of example, upon the confirmation of the legal identity of ownership, the legal estimate of the value of the property, and the existence of sufficient equity for security, the individual proposing to alien his or her property may (after appropriate proof of identity) implement alienation of the subject property by contract (either in person or electronically) and provide collateral for the release of the individual charged.

At step 310 an inquiry is made as to whether the value of the property is sufficient to justify the use of a property bond. By way of example, the application can be evaluated based upon one or more decision factors. Decision factors include for example, but are not limited to, property value, required security amount to secure the release of the incarcerated, credit bureau factors, amount of indebtedness relative to the value of the property, and the like. The one or more decision factors can be ranked on a predetermined scale to quantify an impact to the corrections facility, or the like, of acceptance of the property bond from the applicant based on the property identification data and the applicant identification data. A single numerical value can be calculated representative of the rank of each of the one or more decision factors. The calculated value can be compared with a predetermined benchmark to determine whether issuance of the property bond is a suitable option for the correction facility, or the like, to accept. The property bond can be issued if it is determined to be a suitable option.

At step 350, assuming that the property value was determined insufficient, the property bond application is declined. The applicant must pursue another option. Alternative options may include, for example, use of a traditional bail bondsman, or the like.

At step 320, assuming that the property value was determined sufficient, the property bond application submitted by applicant is accepted. As such the owner of the property authorizes alienation against the property.

At step 330 the property is legally alienated in the appropriate property records. As such the amount of the security required to release the incarcerated, plus any transaction fees, or the like, is placed as a lien against the property disclosed in the application. The lien is recorded in a public recordation system dedicated to recording such property liens and encumbrances.

At step 340 the appropriate notification is provided. The inmate is therefore released. The method and process for obtaining a property bond terminates in method step 360.

As will be apparent to one of ordinary skill in the art, upon reading this disclosure, some of the above methods steps may be implemented in varying order depending on the given circumstances. Additionally, one or more method steps may be omitted under the appropriate circumstances.

Figure 4:
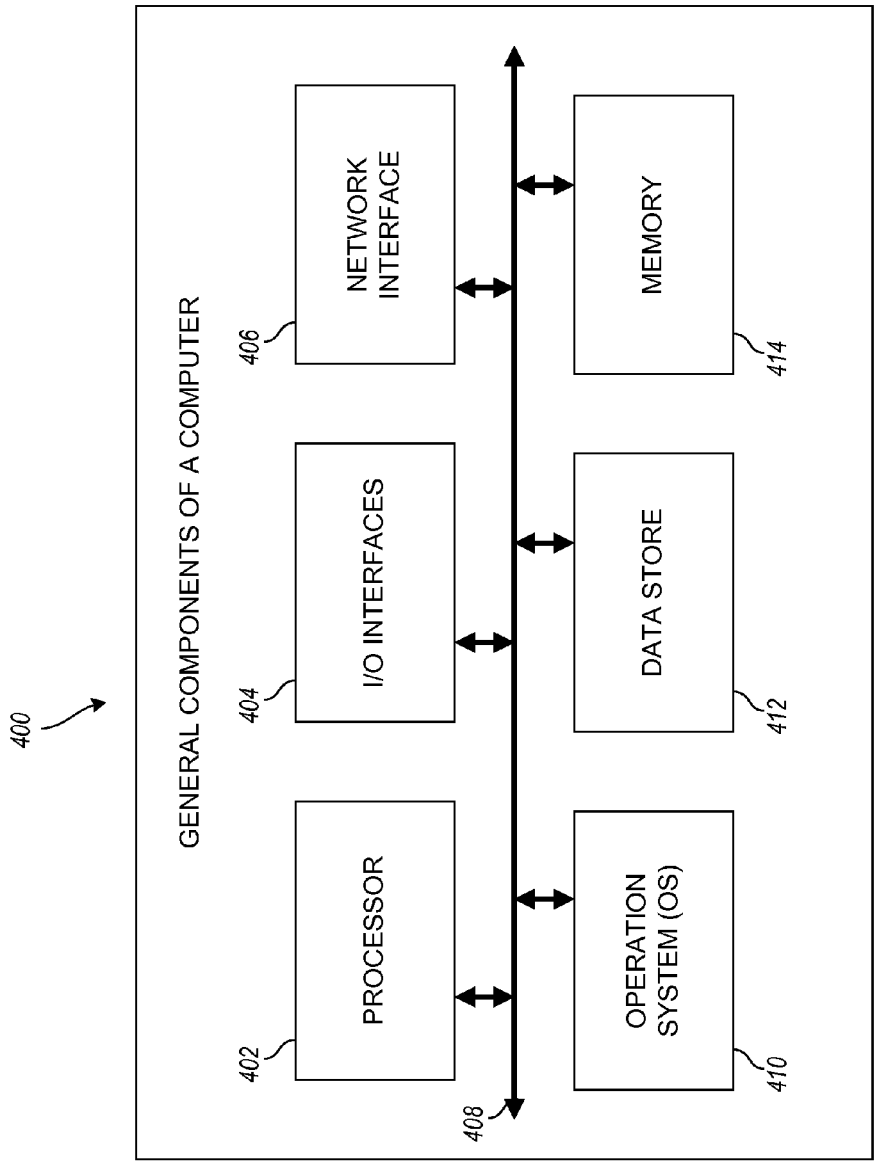
FIG. 4 is a block diagram illustrating the general components of a computer according to an exemplary embodiment of the technology.

Referring now to FIG. 4, a block diagram 400 illustrating the general components of a computer is shown. Any one or more of the computers, servers, database, and the like, disclosed above, may be implemented with such hardware and software components. The computer 400 can be a digital computer that, in terms of hardware architecture, generally includes a processor 402, input/output (I/O) interfaces 404, network interfaces 406, an operating system (O/S) 410, a data store 412, and a memory 414. The components (402, 404, 406, 410, 412, and 414) are communicatively coupled via a local interface 408. The local interface 408 can be, for example but not limited to, one or more buses or other wired or wireless connections, as is known in the art. The local interface 408 can have additional elements, which are omitted for simplicity, such as controllers, buffers (caches), drivers, among many others, to enable communications. Further, the local interface 408 can include address, control, and/or data connections to enable appropriate communications among the aforementioned components. The general operation of a computer comprising these elements is well known in the art.

The processor 402 is a hardware device for executing software instructions. The processor 402 can be any custom made or commercially available processor, a central processing unit (CPU), an auxiliary processor among several processors associated with the computer 400, a semiconductor-based microprocessor (in the form of a microchip or chip set), or generally any device for executing software instructions. When the computer 400 is in operation, the processor 402 is configured to execute software stored within the memory 414, to communicate data to and from the memory 414, and to generally control operations of the computer 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example but not limited to, a serial port, a parallel port, a small computer system interface (SCSI), an infrared (IR) interface, a radio frequency (RF) interface, and/or a universal serial bus (USB) interface.

The network interfaces 406 can be used to enable the computer 400 to communicate on a network. For example, the computer 400 can utilize the network interfaces 408 to communicate via the internet to other computers or servers for software updates, technical support, etc. The network interfaces 408 can include, for example, an Ethernet card (e.g., 10BaseT, Fast Ethernet, Gigabit Ethernet) or a wireless local area network (WLAN) card (e.g., 802.11a/b/g). The network interfaces 408 can include address, control, and/or data connections to enable appropriate communications on the network.

A data store 412 can be used to store data, such as information regarding positions entered in a requisition. The data store 412 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 412 can incorporate electronic, magnetic, optical, and/or other types of storage media. In one example, the data store 412 can be located internal to the computer 400 such as, for example, an internal hard drive connected to the local interface 408 in the computer 400. Additionally in another embodiment, the data store can be located external to the computer 400 such as, for example, an external hard drive connected to the I/O interfaces 404 (e.g., SCSI or USB connection). Finally in a third embodiment, the data store may be connected to the computer 400 through a network, such as, for example, a network attached file server.

The memory 414 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 414 may incorporate electronic, magnetic, optical, and/or other types of storage media. Note that the memory 414 can have a distributed architecture, where various components are situated remotely from one another, but can be accessed by the processor 402.

The software in memory 414 can include one or more software programs, each of which includes an ordered listing of executable instructions for implementing logical functions. In the example of FIG. 4, the software in the memory system 414 includes the interactive toolkit for sourcing valuation and a suitable operating system (O/S) 410. The operating system 410 essentially controls the execution of other computer programs, such as the interactive toolkit for sourcing valuation, and provides scheduling, input-output control, file and data management, memory management, and communication control and related services. The operating system 410 can be any of Windows NT, Windows 2000, Windows XP, Windows Vista, Windows 7 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or other like operating system with similar functionality.

In an exemplary embodiment of the technology described herein, the computer 400 is configured to perform flowcharts 200 and 300 depicted in FIGS. 2 and 3 respectively.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A non-transitory computer readable storage medium encoded with programming for simultaneously collating information from available public, private, and government databases for provision to corrections facilities, authorized bond administrators, and stakeholders for electronic transmission of secured and confirmed data to effectuate implementation of obligation on a property bond as security for court appearances for an accused, the computer readable medium encoded with programming configured to:
receive from an applicant an application identifying a property upon which a lien is to be placed to serve as collateral for an issuance of a property bond for release of an incarcerated person, the application having a plurality of identification data on the property and having a plurality of identification data on the applicant;
access at least one data store to obtain at least one data point upon which to evaluate the one or more of the identification data on the property and the identification data on the applicant;
evaluate the application based upon one or more decision factors; rank the one or more decision factors on a predetermined scale to quantify an impact to the corrections facility, or the like, of acceptance of the property bond from the applicant based on the property identification data and the applicant identification data;
calculate a single numerical value representative of the rank of each of the one or more decision factors;
compare the calculated value with a predetermined benchmark to determine whether issuance of the property bond is a suitable option for the correction facility, or the like, to accept; and
issue the property bond if determined to be a suitable option.

2. The non-transitory computer readable storage medium encoded with programming of claim 1, wherein the programming is further configured to:
confirm the identification data on the applicant and the identification data on the property with at least one first real estate digest, wherein the at least one data store comprises the at least one first real estate digest selected from the group consisting of: federal, state, and local real estate property registries, each of which shows the legal owner and address of real property.

3. The non-transitory computer readable storage medium encoded with programming of claim 1, wherein the programming is further configured to:
confirm the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property.

4. The non-transitory computer readable storage medium encoded with programming of claim 1, wherein the programming is further configured to:
test the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation; and
extrapolate an estimated real estate value of the property.

5. The non-transitory computer readable storage medium encoded with programming of claim 1, wherein the programming is further configured to:
test an estimated value of the property against confirmed obligations to check whether a required security for the appearance of a person charged is adequate; and
evaluate the adequacy of the security.

6. The non-transitory computer readable storage medium encoded with programming of claim 1, wherein the programming is further configured to:
test an estimated value of the property, the identification data on the applicant, and the identification data on the property against a required security to issue the property bond.

7. The non-transitory computer readable storage medium encoded with programming of claim 3, wherein the programming is further configured to:
test the amounts of the recorded liens and encumbrances against individuals and specific property against credit bureau balances.

8. The non-transitory computer readable storage medium encoded with programming of claim 1, wherein the programming is further configured to:
utilize an interactive, on-screen interview questionnaire.

9. The non-transitory computer readable storage medium encoded with programming of claim 8, wherein the programming is further configured to:
coach an applicant as the applicant responds to the interactive, on-screen interview questionnaire.

10. The non-transitory computer readable storage medium encoded with programming of claim 1, wherein the programming is further configured to:
allow the addition of one or more decision factors interactively by an operator based on a particular functional or operational driver currently unaddressed.

11. The non-transitory computer readable storage medium encoded with programming of claim 1, wherein the programming is further configured to:
allow the rescaling, by an operator, of the predetermined scale used to quantify each decision factor's impact to the corrections facility, or the like, in response to business drivers.

12. The non-transitory computer readable storage medium encoded with programming of claim 1, wherein the programming is further configured to:
allow the reconfiguration, by an operator, of the predetermined benchmark used determine whether issuance of the property bond is a suitable option.

13. A method for simultaneously collating information from available public, private, and government databases for provision to corrections facilities, authorized bond administrators, and stakeholders for electronic transmission of secured and confirmed data to effectuate implementation of obligation on a property bond as security for court appearances for an accused, the method comprising:
receiving from an applicant an application identifying a property upon which a lien is to be placed to serve as collateral for an issuance of a property bond for release of an incarcerated person, the application having a plurality of identification data on the property and having a plurality of identification data on the applicant;
accessing, by a computer at least one data store to obtain at least one data point upon which to evaluate the one or more of the identification data on the property and the identification data on the applicant;

evaluating, by the computer the application based upon one or more decision factors;

ranking, by the computer the one or more decision factors on a predetermined scale to quantify an impact to the corrections facility, or the like, of acceptance of the property bond from the applicant based on the property identification data and the applicant identification data;

calculating, by the computer a single numerical value representative of the rank of each of the one or more decision factors;

comparing, by the computer the calculated value with a predetermined benchmark to determine whether issuance of the property bond is a suitable option for the correction facility, or the like, to accept; and issuing, by the computer the property bond if determined to be a suitable option.

14. The method of claim 13, further comprising:

confirming the identification data on the applicant and the identification data on the property with at least one first real estate digest, wherein the at least one data store comprises the at least one first real estate digest selected from the group consisting of: federal, state, and local real estate property registries, each of which shows the legal owner and address of real property.

15. The method of claim 13, further comprising:

confirming the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property.

16. The method of claim 13, further comprising:

testing the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation; and extrapolating an estimated real estate value of the property.

17. The method of claim 13, further comprising:

testing an estimated value of the property against confirmed obligations to check whether a required security for the appearance of a person charged is adequate; and evaluating the adequacy of the security.

18. The method of claim 13, further comprising:

testing an estimated value of the property, the identification data on the applicant, and the identification data on the property against a required security to issue the property bond.

19. A non-transitory computer program product for simultaneously collating information from available public, private, and government databases for provision to corrections facilities, authorized bond administrators, and stakeholders for electronic transmission of secured and confirmed data to effectuate implementation of obligation on a property bond as security for court appearances for an accused, the computer program product comprising: a computer readable storage medium readable by a processor of a computer and configured to store instructions for execution by the processor for performing a method comprising:

receiving from an applicant an application identifying a property upon which a lien is to be placed to serve as collateral for an issuance of a property bond for release of an incarcerated person, the application having a plurality of identification data on the property and having a plurality of identification data on the applicant;

accessing at least one data store to obtain at least one data point upon which to evaluate the one or more of the identification data on the property and the identification data on the applicant;

evaluating the application based upon one or more decision factors;

ranking the one or more decision factors on a predetermined scale to quantify an impact to the corrections facility, or the like, of acceptance of the property bond from the applicant based on the property identification data and the applicant identification data;

calculating a single numerical value representative of the rank of each of the one or more decision factors;

comparing the calculated value with a predetermined benchmark to determine whether issuance of the property bond is a suitable option for the correction facility, or the like, to accept; and issuing the property bond if determined to be a suitable option.

20. The non-transitory computer program product of claim 19, wherein the computer readable storage medium readable by the processor of the computer and configured to store instructions for execution by the processor is further configured for performing methods steps comprising:

confirming the identification data on the applicant and the identification data on the property with at least one first real estate digest, wherein the at least one data store comprises the at least one first real estate digest selected from the group consisting of: federal, state, and local real estate property registries, each of which shows the legal owner and address of real property;

confirming the identification data on the applicant and the identification data on the property for the existence of any mortgages and liens, wherein the at least one data store comprises at least one second real estate digest selected from the group consisting of: federal, state, and local real estate liens registries, each of which shows the recorded liens and encumbrances against individuals and specific property;

testing the identification data on the applicant and the identification data on the property against a tax database to obtain an estimated value for an amount and existence of current legal valuation, wherein the at least one data store comprises at least one tax database selected from the group consisting of: federal, state, and local tax databases, each of which shows the amount and existences of current legal valuation;

extrapolating an estimated real estate value of the property;

testing an estimated value of the property against confirmed obligations to check whether a required security for the appearance of a person charged is adequate;

evaluating the adequacy of the security; and testing an estimated value of the property, the identification data on the applicant, and the identification data on the property against a required security to issue the property bond.

* * * * *